United States Patent
Okada (10) Patent No.: US 8,988,206 B2
(45) Date of Patent: Mar. 24, 2015

(54) IN-VEHICLE INFORMING DEVICE AND INFORMING METHOD

(71) Applicant: DENSO CORPORATION, Kariya, Aichi-pref. (JP)

(72) Inventor: Koudai Okada, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 13/798,817

(22) Filed: Mar. 13, 2013

(65) Prior Publication Data

US 2013/0271276 A1 Oct. 17, 2013

(30) Foreign Application Priority Data

Apr. 11, 2012 (JP) .................................. 2012-90145

(51) Int. Cl.
 *B60Q 1/00* (2006.01)
 *F02N 11/08* (2006.01)
 *G06F 19/00* (2011.01)
 *F02D 41/22* (2006.01)

(52) U.S. Cl.
 CPC .............. *B60Q 1/00* (2013.01); *F02N 11/0814* (2013.01); *F02D 2041/228* (2013.01); *F02N 2200/123* (2013.01); *Y02T 10/48* (2013.01)
 USPC .......... 340/441; 340/439; 123/179.4; 701/112

(58) Field of Classification Search
 CPC ........... B60Q 1/00; F02N 11/08; F02N 17/00; G06F 17/00; F02D 43/00; F02D 45/00; F02D 41/04; F02D 41/08
 USPC ........................................................ 340/441
 See application file for complete search history.

(56) References Cited

U.S. PATENT DOCUMENTS

| | | | | |
|---|---|---|---|---|
| 7,657,366 | B2 * | 2/2010 | Guy et al. | 701/112 |
| 7,698,053 | B2 * | 4/2010 | Mori | 701/112 |
| 8,402,936 | B2 * | 3/2013 | Nakamura | 123/179.4 |
| 8,417,435 | B2 * | 4/2013 | Yamaguchi | 701/102 |
| 8,712,673 | B2 * | 4/2014 | Gwon et al. | 701/112 |
| 2002/0017261 | A1 * | 2/2002 | Kuroda et al. | 123/179.4 |
| 2005/0087169 | A1 * | 4/2005 | Yoshida et al. | 123/299 |
| 2007/0267238 | A1 | 11/2007 | Guy et al. | |
| 2009/0271087 | A1 * | 10/2009 | Motonaga | 701/102 |
| 2011/0106413 | A1 * | 5/2011 | Park et al. | 701/112 |

* cited by examiner

*Primary Examiner* — Jennifer Mehmood
*Assistant Examiner* — John Mortell
(74) *Attorney, Agent, or Firm* — Posz Law Group, PLC (57) ABSTRACT

The present disclosure provides an in-vehicle informing device equipped in a vehicle including an idle stop system so that a driver is prevented from mistaking an engine stop state by the idle stop system for the engine stop state by an OFF position of an ignition switch. The device first determines whether an engine is automatically stopped by the idle stop system. The device determines whether a stop state of the vehicle corresponds to specific drive suspending condition when the engine is automatically stopping by the idle stop system. The device informs the driver that the engine is automatically stopped by the idle reduction function, utilizing an information giving portion equipped in the vehicle when the driver is judged as in the drive suspending state.

11 Claims, 6 Drawing Sheets

IN-VEHICLE INFORMING DEVICE AND INFORMING METHOD

CROSS REFERENCE TO RELATED APPLICATION

This application is based on Japanese Patent Application No. 2012-90145 filed on Apr. 11, 2012, the disclosure of which is incorporated herein by reference.

TECHNICAL FIELD

The present disclosure relates to an in-vehicle informing device equipped in a vehicle including an idle reduction system (also called herein an idle stop system). The present disclosure relates to an informing method for a vehicle including an idle reduction system.

BACKGROUND

Conventionally, a vehicle equipped with an automatic engine stop-start system is used practically. When an auto stop condition is established while driving, the automatic engine stop-start system automatically stops an engine (an internal combustion engine) of the vehicle. Subsequently when an auto start condition is established, the automatic engine stop-start system restarts the engine so that a fuel efficiency is improved. The automatic engine stop-start system is generally called an idle reduction system, an idle stop system, or, an idle stop-start system.

Japanese Patent No. 4688877 corresponding to US 2007/0267238 A1 discloses a control method in which the engine of the vehicle equipped with the idle stop system is prevented from stopping automatically or starting when a driver is absent.

The inventor of the present application has found the followings. In the vehicle equipped with the idle stop system, there is a possibility that the driver mistakes an auto engine stop state, which is set by the idle stop system, for a manual engine stop state, which is set by an OFF position of an ignition switch.

For example, when the driver waits for a light to change at crossroads, it is not likely that the driver misjudges the engine stop state set by the idle stop system as the engine stop state set by OFF of the ignition switch because the driver continues to drive the vehicle. However, for example, while the driver stops the vehicle at a rotary in front of a station or at a parking space with a parking meter in order to wait for a person, the driver may interrupt the drive of the vehicle for a long time while sitting on a driver seat. In a condition that the driver interrupts the drive of the vehicle for a long time while sitting in the driver seat, a memory of the driver about a cause of the present engine stop state is likely to become obscure. Accordingly, although the engine stop state has been actually set by the idle stop system, the driver may misunderstand and judge that an ignition switch is in an OFF position.

In a case where the driver mistakes the engine stop state by the idle stop system for the engine stop state by an OFF position of an ignition switch, the driver may conduct an operation corresponding to an auto start condition based on his or her misunderstanding that the engine is not going to restart. The operation corresponding to an auto start condition includes, for example, the operation such as that the driver releases a foot brake while setting a shift range to a drive range. In this case, the engine of the vehicle may restart against a driver's intention.

SUMMARY

It is an object of the present disclosure to provide an in-vehicle informing device that is equipped in a vehicle including an idle reduction system, and that can prevent a driver from mistaking an engine stop state by the idle reduction system for the engine stop state by an OFF position of an ignition switch. It is also an object of the present disclosure to provide an informing device.

According to a first aspect of the present disclosure, an in-vehicle informing device is equipped in a vehicle with an idle reduction function which causes an engine of the vehicle to be stopped automatically in response to fulfillment of a predetermined stop condition and thereafter causes the engine to be restarted automatically in response to fulfillment of a predetermined restart condition. The in-vehicle informing device includes a stop cause check section, a drive state check section, and an alert section. The stop cause check section determines whether or not the engine is in an stop state by having been automatically stopped by the idle reduction function. When the stop cause check section determines that the engine is in the stop state by having been automatically stopped the idle reduction function, the rive state check section (i) obtains stop state data about a stop state of the vehicle, (ii) determines whether or not the stop state of the vehicle indicated by the stop state data corresponds to a specified drive suspending condition, and (iii) determines that a driver of the vehicle is in a drive suspending state when the drive state check section determines that the stop state of the vehicle indicated by the stop state data corresponds to the specified drive suspending condition. When the drive state check section determines that the driver is in the drive suspending state, the alert section informs the driver that the engine is in the stop state by having been automatically stopped by the idle reduction function, by utilizing an information giving portion equipped in the vehicle.

According to a second aspect of the present disclosure, an informing method in a vehicle with an idle reduction function which causes an engine of the vehicle to be stopped automatically in response to fulfillment of a predetermined stop condition and thereafter causes the engine to be restarted automatically in response to fulfillment of a predetermined restart condition is provided. The informing method includes: determining whether or not the engine is in an stop state by having been automatically stopped by the idle reduction function; in cases where the engine is in the stop state by having been automatically stopped the idle reduction function, (i) obtaining stop state data about a stop state of the vehicle, (ii) determining whether or not the stop state of the vehicle indicated by the stop state data corresponds to a specified drive suspending condition, and (iii) determining that a driver of the vehicle is in a drive suspending state when the stop state of the vehicle indicated by the stop state data corresponds to the specified drive suspending condition; and informing the driver that the engine is in the stop state by having been automatically stopped by the idle reduction function, by utilizing an information giving portion equipped in the vehicle, in cases where the driver is in the drive suspending state.

According to the above in-vehicle informing device and informing method, it is possible to prevent the driver from mistaking the engine stop state by the idle reduction system for the engine stop state by the OFF position of an ignition switch.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

As follows, one embodiment in the disclosure will be described with reference to the drawings. It should be understood that the disclosure is not limited to the embodiment described below and various modifications can be made.

First Embodiment

Figure 1:
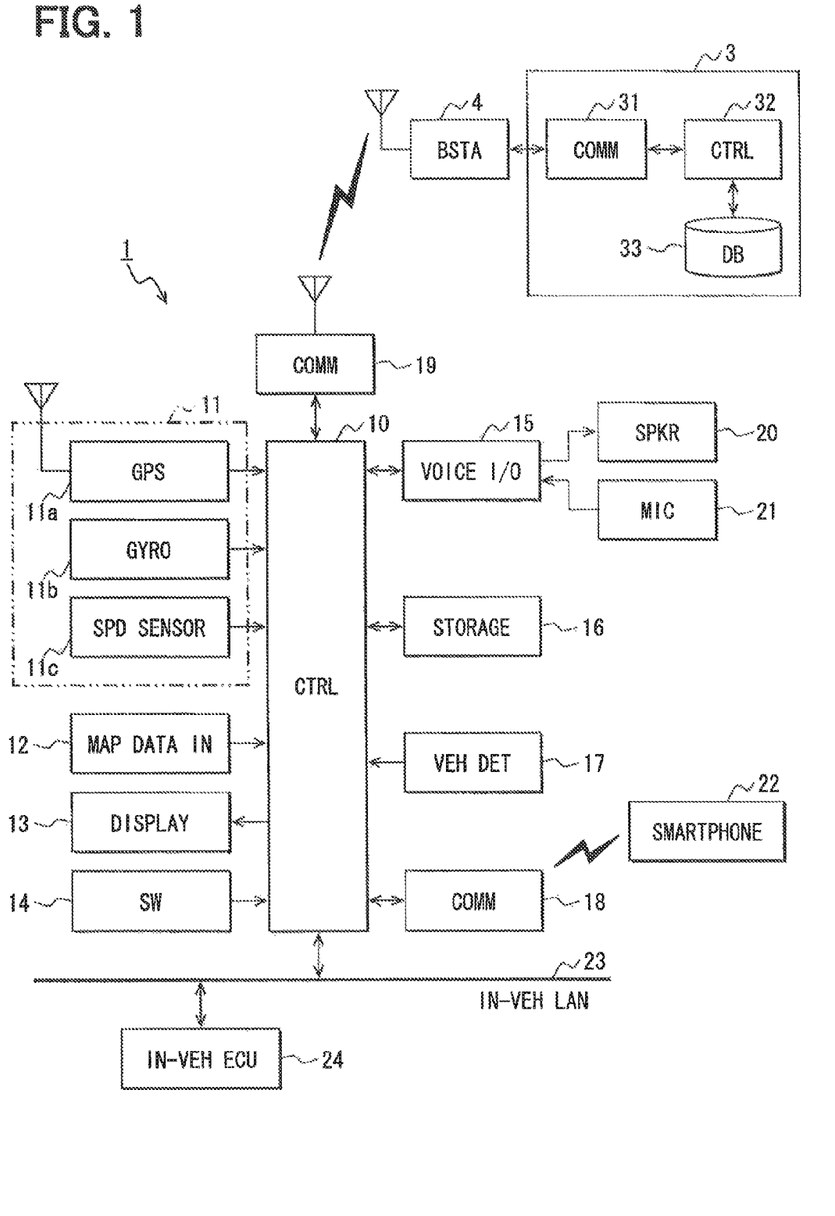
FIG. 1 is a block diagram illustrating an outline configuration of an in-vehicle device.

A configuration of an in-vehicle device 1 will be described below. The in-vehicle device 1 in the present embodiment is a control device equipped in a vehicle having an idle stop function (idle reduction system). For example, the in-vehicle device 1 is embodied as a navigation device and the like. As shown in FIG. 1, the in-vehicle device 1 includes a control portion 10. The control portion 10 is connected with a position detector 11, a map data input portion 12, a display unit 13, a group of operating switches 14, a voice input/output interface 15, a storage portion 16, a surrounding vehicle detector 17, a short range communicator 18, a radio communication portion 19 and the like.

The control portion 10 includes a known information processing unit having a CPU, a ROM, a RAM, an input/output interface (not shown). The control portion 10 integrally controls the elements connected with the control portion 10. The ROM of the control portion 10 stores a program, data and the like which are required for an operation of the in-vehicle device 1. In executing the program, the control portion 10 temporarily stores processing data in the RAM. The control portion 10 obtains various kinds of information and controls in-vehicle instruments by communicating with in-vehicle ECUs 24 such as a power train ECU and a body ECU through an in-vehicle LAN 23.

The position detector 11 detects a present location of the vehicle. The position detector 11 includes a GPS receiver 11a, a gyroscope 11b and a vehicle speed sensor 11c. The GPS receiver 11a receives a positioning signal from a GPS satellite. The gyroscope 11b detects an angular velocity. The vehicle speed sensor 11c detects a vehicle speed. It is noted that an acceleration sensor for detecting acceleration in each of three mutually perpendicular planes or an inclination sensor for detecting an angle of inclination of the vehicle may be substituted for a part of the elements of the position detector 11, or may be added to the position detector 11. The position detector 11 precisely detects a position with interpolating the detector signals of these elements.

The map data input portion 12 inputs a map data (a map information) for navigation. The map data is stored in a high capacity storage medium such as s CD-ROM, a DVD-ROM, a hard disk drive, a nonvolatile semiconductor memory and the like. The map data includes (i) map rendering data for displaying a map, (ii) road data for processing of map matching, route finding and route guidance, (iii) crossroads data, (iv) background data for displaying a background layer, (v) place name data for displaying a location such as a place name and a region, and the like. Additionally the map data includes data such as facility data recording detailed data about each facility, position data for a service area, a perking area and a parking lot.

The display unit 13 outputs and displays various kinds of image information according to an image signal inputted from the control portion 10. For example, the display unit 13 includes a liquid crystal display located in a vicinity of a driver seat of the vehicle. The operating switches 14 inputs a command and the like regarding a user's operation to the control portion 10. The operating switches 14 include a mechanical switch arranged around the display unit 13, a touch panel arranged on a surface of the display unit 13, and the like.

The voice input/output interface 15 is connected with a speaker 20 and a microphone 21. The voice input/output interface 15 includes a voice synthesis circuit and the like to generate a voice and output the voice from the speaker 20 according to a voice signal from the control portion 10 and to receive a voice signal through the microphone 21. The voice signal from the microphone 21 includes voice data for inputting a user's command to the control portion 10. The voice input/output interface 15 recognizes the command included in the voice data through the microphone 21 and outputs a result of the recognition to the control portion 10.

The storage portion 16 includes a high capacity storage portion such as a hard disk drive, a memory card and the like. The storage portion 16 stores learning data about a vehicle travel history of the in-vehicle device 1 and downloaded data from a center device 3. The vehicle travel history of the learning data includes when (a date), where (a place), what (an event) in a previous vehicle driving. The learning data also includes a place and a date at the end of a vehicle driving, that is, when an ignition switch is turned off.

The surrounding vehicle detector 17 includes sensors such as a radar, a sonar and a camera to detect other vehicles around the subject vehicle (i.e., the vehicle equipped with the in-vehicle device 1). The surrounding vehicle detector 17 detects a position of another vehicle, a distance between the subject vehicle and another vehicle, and a relative velocity of another vehicle.

The short range communicator 18 communicates with a high performance mobile phone 22 (such as a smart phone) of a driver or other passengers, using a predetermined short range communication. The radio communication portion 19 communicates with the center device 3 through a wide area network.

The center device 3 is a data processing device located in an organization (a data center) which provides various kinds of information to vehicles in a wide area. The center device 3 communicates with the in-vehicle device 1 through a wide area network, including widely and plentifully arranged base stations 4 and a mobile phone communication network. The center device 3 includes a communication portion 31 for communicating with the outside through the base station 4, a control portion 32, a database 33 and the like. The center device 3 collects various kinds of data from many vehicles and data service organizations through the wide area network so as to store in the database 33. The collected data includes probe data uploaded by a probe car which travels various places, traffic jam information, weather information, facility data, and the vehicle travel history.

Figure 2:
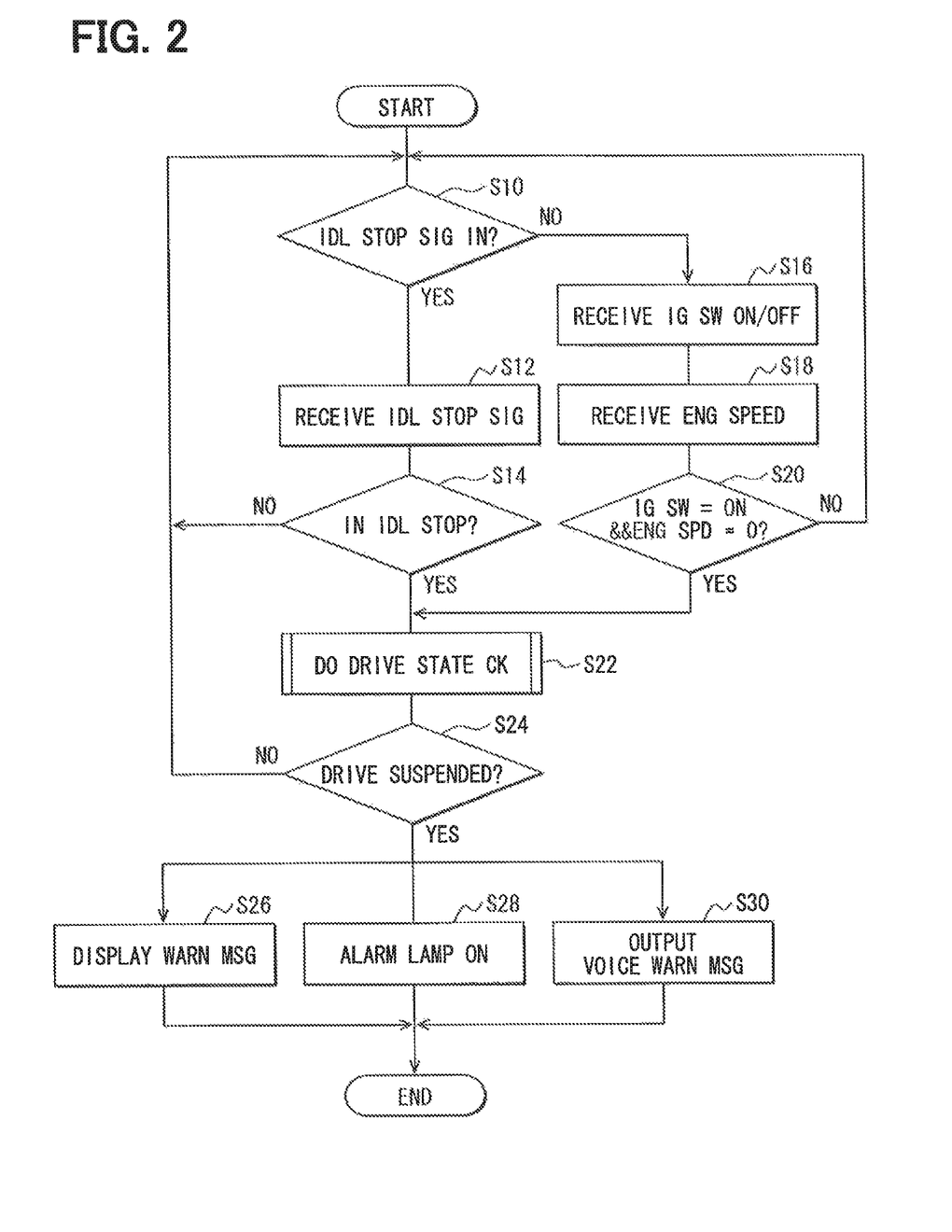
FIG. 2 is a flowchart illustrating an alert process.

As follows, a procedure for an alert process which is executed by the control portion 10 of the in-vehicle device 1 will be described with reference to a flowchart in FIG. 2. The alert process is repeatedly executed while the in-vehicle device 1 is in operation.

At S10, the control portion 10 determines whether an idle stop signal is inputted. The idle stop signal indicates whether the engine is in a automatic stop state under control of an idle stop ECU, which controls the idle stop of an engine. The idle stop signal is inputted from the engine ECU through the in-vehicle LAN 23. When the idle stop signal is inputted, which corresponds to YES at S10, the process proceeds to S12. When the idle stop signal is not inputted, which corresponds to NO at S10, the process proceeds to S16.

At S12, the control portion 10 receives the idle stop signal from the idle stop ECU. At S14, according to the received idle stop signal, the control portion 10 determines whether the engine is in the automatic stop state because of the idle stop function. When the engine is in the automatic stop state because of the idle stop function, which corresponds to YES at S14, the process proceeds to S22. When the idle stop function is not in operation, which corresponds to NO at S14, the process goes to S10.

At S16, the control portion 10 receives ON/OFF state data of an ignition switch through the in-vehicle LAN 23. At S18, the control portion 10 receives engine speed data through the in-vehicle LAN 23. At S20, the control portion 10 determines whether the ignition switch is in an "ON" position and the engine speed is zero, based on the obtained data at S16 and S20. It is noted that the condition where the ignition switch is in the "ON" position and the engine speed is zero indicates that the engine is in the automatic stop state because the idle stop function is in operation. When the ignition switch is in the "ON" position and the engine speed is zero, that is, the idle stop function is automatically stopping the engine, which corresponds to YES at S20, the process proceeds to S22. In a case that does not correspond to the case where the ignition switch is in an "ON" position and the engine speed is zero, that is, in a case where the idle stop function is not in operation, which corresponds to NO at S20, the process goes to S10.

At S22, the control portion 10 executes a drive state check process. In the drive state check process, the control portion 10 determines whether the driver is in a drive continuation state or a drive suspending state. The drive continuation state is a state where the driver keeps traveling the vehicle. The drive suspending state is a state where the driver is suspended from driving. The drive continuation state is, for example, a case where a series of driving operation for traveling the vehicle is continuing, although the vehicle is temporarily stopped because of waiting for a light to change at crossroads. On the other hand, the drive suspending state is, for example, a case where a series of driving operation is finished such as when the driver stops the vehicle to wait for a person while staying inside of the vehicle. In the drive state check process, the control portion 10 separately makes determinations as to multiple cases in each which the driver is supposed to be in the drive suspending state. A detailed procedure of the drive state check process corresponding to first to fourth cases will be described below.

At S24, based on a result of the drive state check process at S22, the control portion 10 determines whether the driver is in the drive suspending state. The control portion 10 outputs a positive judgment when the driver is in the drive suspending state corresponding to at least one of the first to fourth drive state check processes as described below. When the driver is in the drive suspending state, which corresponds to YES at S24, the process proceeds to each S26, S28, and S30. On the other hand, when the driver is in the drive continuation state, which corresponds to NO at S24, the process goes to S10.

At each step of S26, S28, and S30, using various kinds of information providing portions (example of information providing means), the control portion 10 notifies that the idle stop function is operating and gives information which urges the driver to change a shift position or turn off the ignition switch. Specifically, a predetermined warning message is displayed on a display of the display unit 13 at S26. The control portion 10 lights or turns on and off an alarm lamp located in an instrument panel or a meter panel by communicating with the body ECU through the in-vehicle LAN 23 at S28. The control portion 10 also outputs a voice of a predetermined warning message from the speaker 20 through the voice input/output interface 15 at S30. In the above, the display unit 13, the speaker 20 and the alarm lamp can correspond to examples of information giving portion and information giving means.

Figure 3:
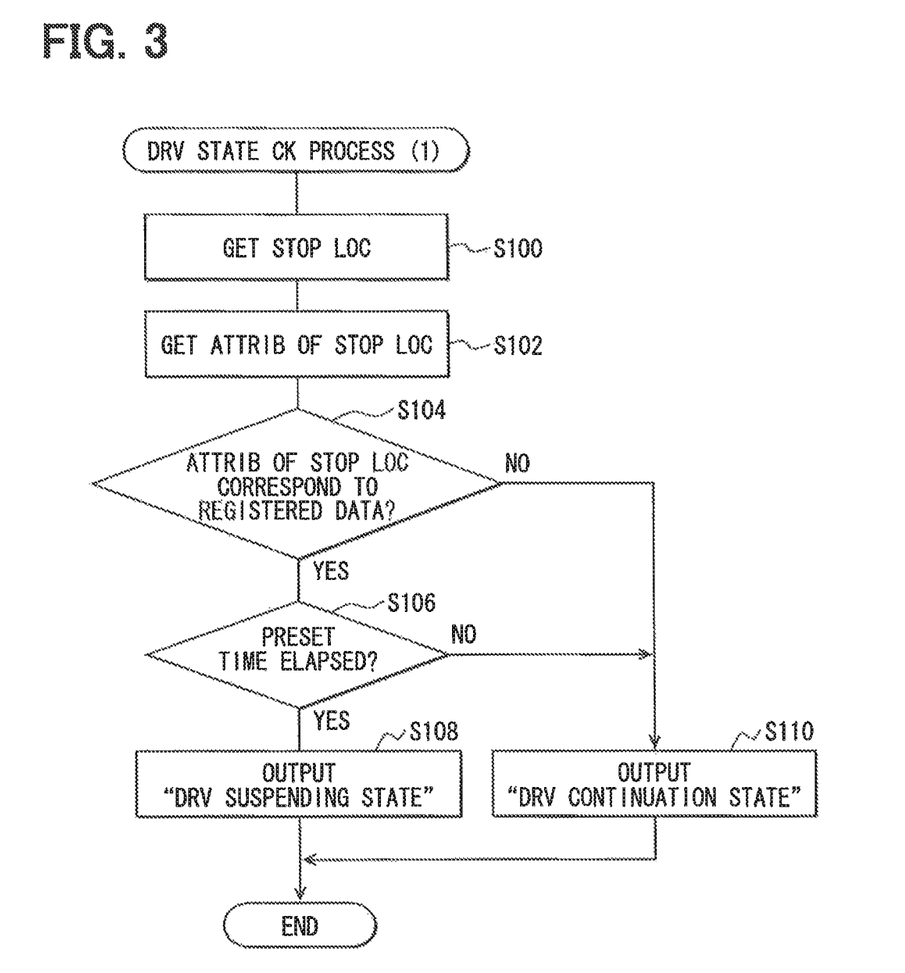
FIG. 3 is a flowchart illustrating a first driving state decision process.

As follows, the procedure of the first drive state check process, which is the first case at S22 in the above described alert process (FIG. 2), will be described with reference to a flowchart in FIG. 3.

At S100, the control portion 10 obtains present location (stop location) data of the vehicle based on a detection result of the position detector 11. At S102, the control portion 10 obtains various attribute data related to the present stop location based on the map data read from the map data input portion 12. In the process at S102, the control portion 10 obtains the attribute data of the stop location, such as a facility corresponding to the present location, an attribute of the facility, and/or an attribute of a road associated with the facility.

At S104, the control portion 10 determines whether the attribute data of the stop location obtained at S102 corresponds to one of a specific facility, an facility with specific attribute, and a road related to a specific facility. The specific facility, the facility with specific attribute and the road related to the specific facility are pre-registered in a memory and the like. It is supposed that the driver becomes in the drive suspending state when the driver stops the specific pre-registered facility or the like. Specifically, the specific facility includes a rotary in front of a station, a parking space with a parking meter, a drive-through area of a fast food restaurant and the like, where it is likely that the driver who stops there waits inside of the vehicle. When the attribute data of the stop location corresponds to the pre-registered specific facility or the like, which corresponds to YES at S104, the process proceeds to S106. On the other hand, when the attribute data of the stop location does not correspond to the pre-registered specific facility or the like, which corresponds to NO at S104, the process proceeds to S110.

At S106, the control portion 10 determines whether or not a present stop state has continued for a predetermined period (e.g., 1 minute) or more. When the stop state has continued for the predetermined period or more, which corresponds to YES at S106, the process proceeds to S108. On the other hand, when the stop state has not continued for more than the predetermined period, which corresponds to NO at S106, the process proceeds to S110.

When the control portion 10 outputs a positive judgment at S106, the process proceeds to S108. At S108, the control portion 10 outputs the drive suspending state as a result of the drive state check process. On the other hand, when the control portion 10 outputs a positive judgment at S104 or S106, the process proceeds to S110. At S110, the control portion 10 outputs the drive continuation state as a result of the drive state check process.

Figure 4:
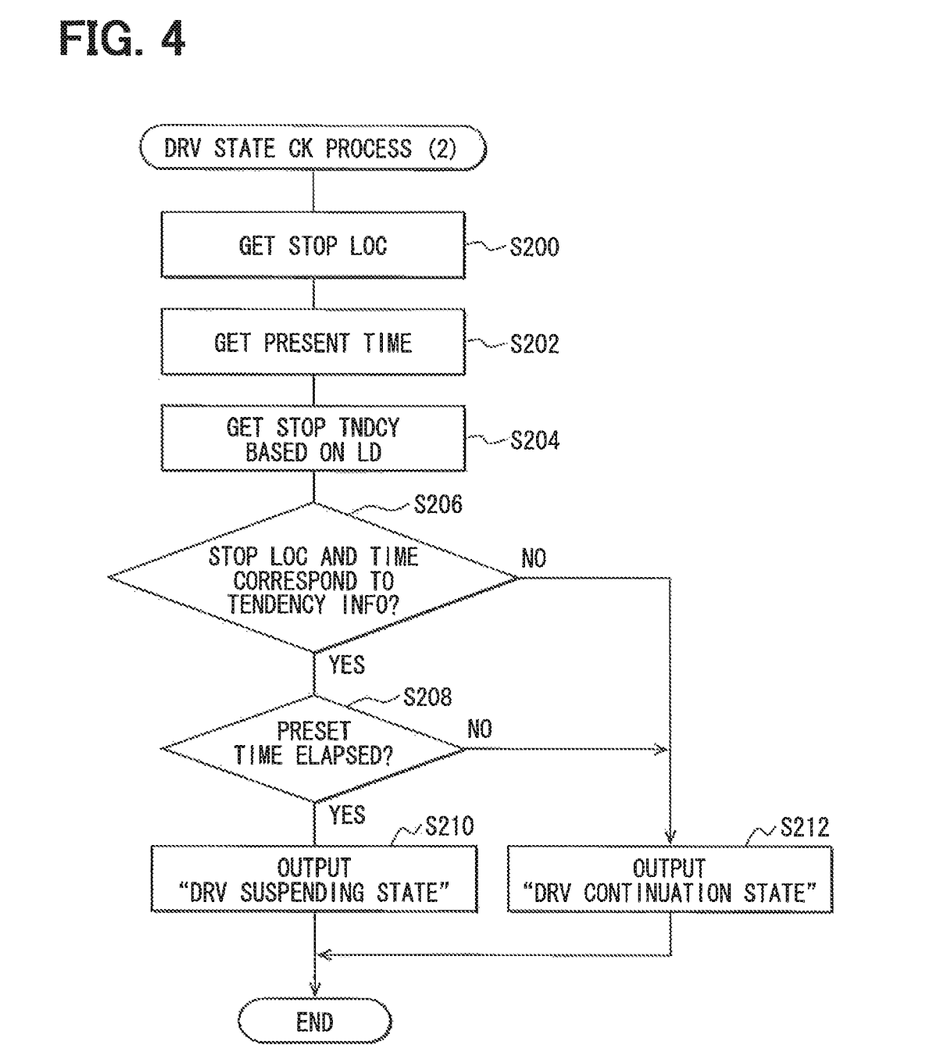
FIG. 4 is a flowchart illustrating a second drive state check process.

Next, the procedure of the second drive state check process, which is the second case at S22 in the above described alert process (FIG. 2), will be described with reference to a flowchart in FIG. 4.

At S200, the control portion 10 obtains present location (stop location) data of the vehicle based on the detection result of the position detector 11. At S202, the control portion 10 obtains present time data indicating the present time. At S204, from learning data about the vehicle travel history, the control portion 10 obtains stop tendency data which corresponds to a stop location and time when a driving of the vehicle was finished, that is when the driver became in the drive suspending state. The control portion 10 may read learning data about the vehicle travel history stored in the stored portion 16 or download learning data about the vehicle travel history stored in the database 33 of the center device 3.

At S206, the control portion 10 calculates compatibility among the present stop location of the vehicle, present time and the obtained stop tendency data including the stop location and time and determines whether the present stop location of the vehicle and the present time match the stop tendency data. The control portion 10 determines the driving state of the driver based on an assumption that when the driver habitually stops at a same position in a same time zone in order to, for example, pick up a family to a cramming school or a lesson, the driver is likely to become in the drive suspending state. When the present stop location and time match the stop tendency data, which corresponds to YES at S206, the process proceeds to S208. On the other hand, when the present stop location and time do not match the stop tendency data, which corresponds to NO at S206, the process proceeds to S212.

At S208, the control portion 10 determines whether or not a present stop state has continued for a predetermined period (e.g., 1 minute) or more. When the stop state has continued for the predetermined period or more, which corresponds to YES at S208, the process proceeds to S210. On the other hand, when the stop state has not continued for the predetermined period, which corresponds to NO at S208, the process proceeds to S212.

At S210, the control portion 10 outputs the drive suspending state as a result of the drive state check process. On the other hand, at S212, the control portion 10 outputs the drive continuation state as a result of the drive state check process.

Figure 5:
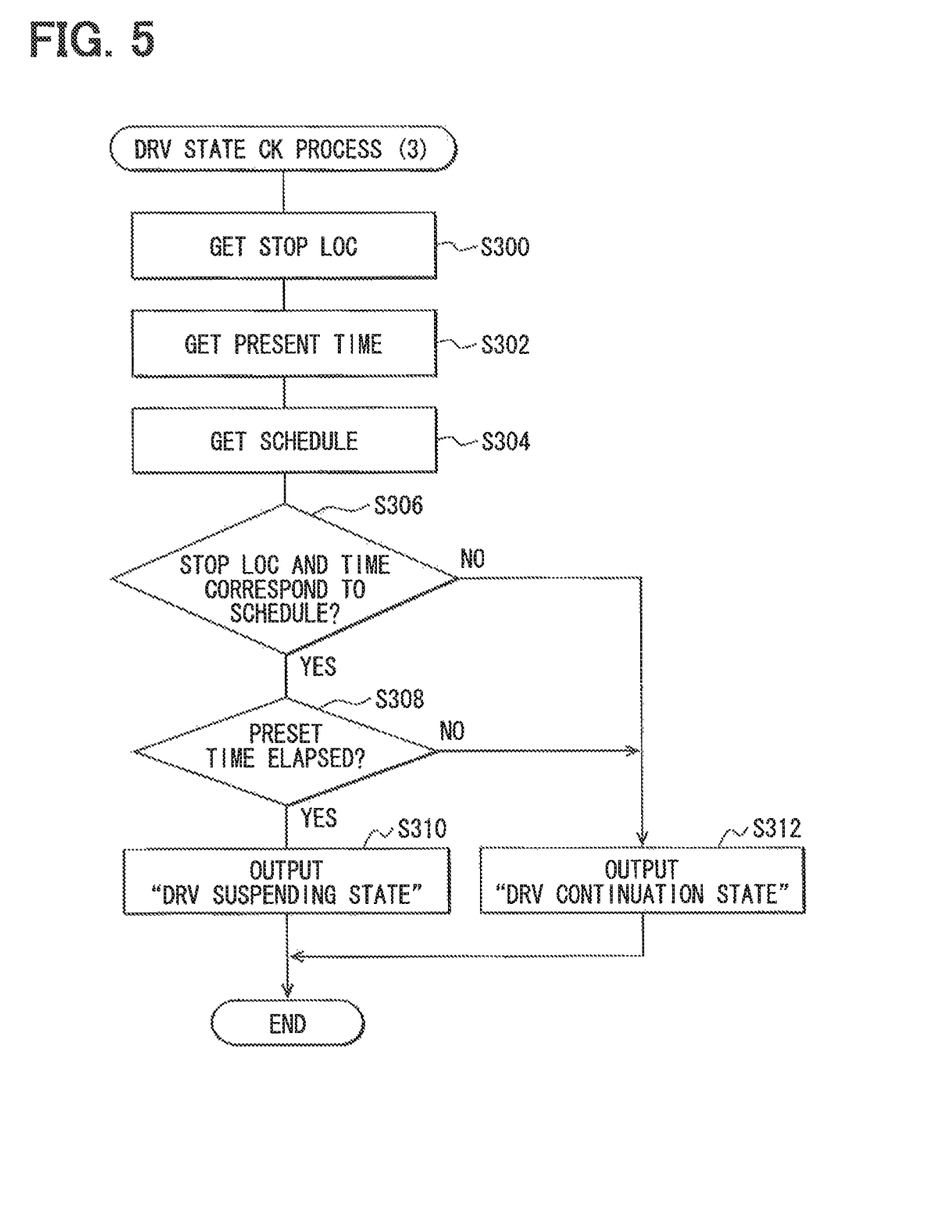
FIG. 5 is a flowchart illustrating a third drive state check process.

Next, the procedure of the third drive state check process which is the third case at S22 in the above described alert process (FIG. 2) will be described with reference to a flowchart in FIG. 5.

At S300, the control portion 10 obtains the vehicle present location (stop location) data based on the detection result of the position detector 11. At S302, the control portion 10 obtains present time data indicating the present time. Next, at S304, the control portion 10 obtains schedule data indicating a behavior plan of the driver from a specified acquisition source. The specified acquisition source may include data of a driver's destination and time in an electrical mail message and management data of schedule management software included in the high performance mobile phone 22 of the driver. The schedule data may be acquired from the acquisition source through the short range communicator 18. Alternatively the control portion 10 may obtain a schedule data which is registered in advance to the in-vehicle device 1 through the operating switches 14.

At S306, the control portion 10 calculates compatibility between (i) a present data, which includes the present stop location of the vehicle and the present time, and (ii) the obtained schedule data, which includes the stop location and time. The control portion 10 determines whether the present data matches the schedule data. The control portion 10 determines the driving state of the driver, on an assumption that when the vehicle is stopping at a location and time indicated in the schedule data reflecting the behavior plan of the driver, the driver is likely to be in the drive suspending state. In the above, the behavior plan of the driver may be to meet a friend, acquaintance or family of the driver. When the present data of the stop location and time matches the schedule data, which corresponds to YES at S306, the process proceeds to S308. On the other hand, when the present data of the stop location and time does not match the schedule data, which corresponds to NO at S306, the process proceeds to S312.

At S308, the control portion 10 determines whether a present stop state has continued for a predetermined period (e.g., 1 minute) or more. When the stop state has continued for the predetermined period or more, which corresponds to YES at S308, the process proceeds to S310. On the other hand, when the stop state has not continued for the predetermined period, which corresponds to NO at S308, the process proceeds to S312.

At S310, the control portion 10 outputs the drive suspending state as a result of the drive state check process. On the other hand, at S312, the control portion 10 outputs the drive continuation state as a result of the drive state check process.

Figure 6:
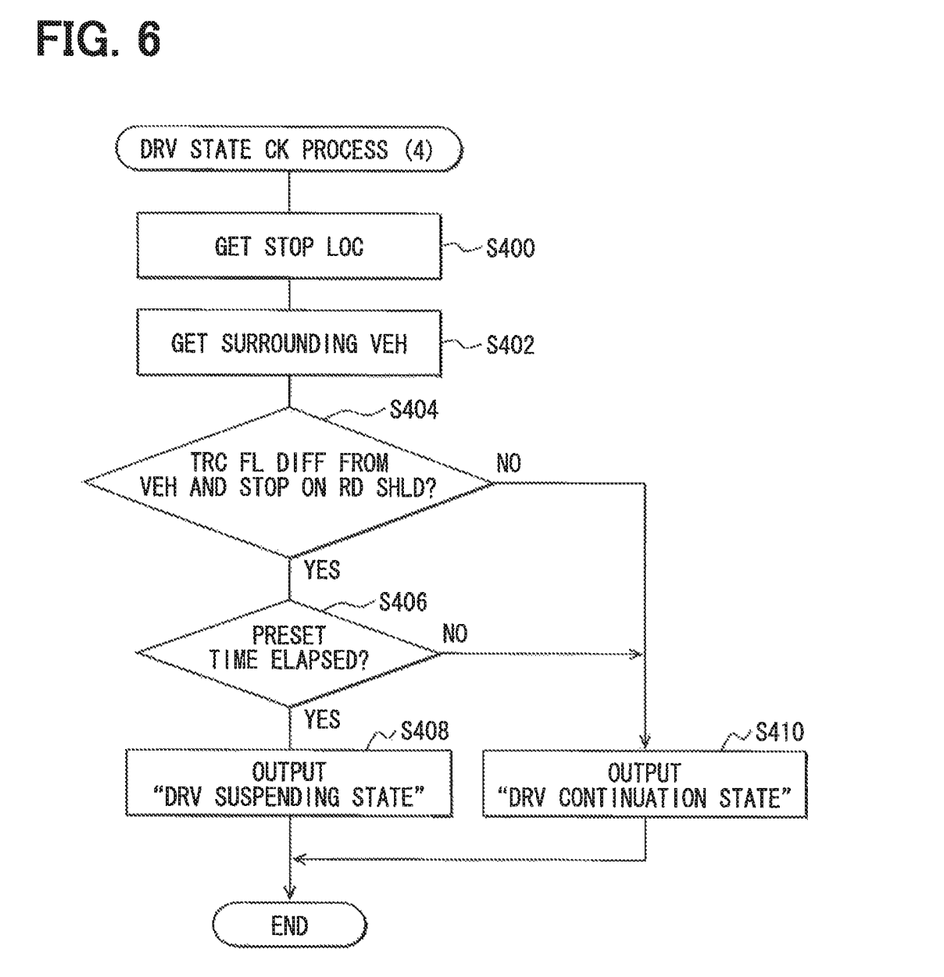
FIG. 6 is a flowchart illustrating a forth drive state check process.

Next, the procedure of the fourth drive state check process which is the fourth case at S22 in the above described alert process (FIG. 2) will be described with reference to a flowchart in FIG. 6.

At S400, the control portion 10 obtains the vehicle present location (stop location) data based on the detection result of the position detector 11. It is noted that the control portion 10 determines which part of the road, such as a traffic lane, a road shoulder and a side strip, the vehicle is stopped, utilizing white line recognition with an in-vehicle camera (not shown) and a high precision positioning with a combination of a GPS satellite and a quasi-zenith positioning satellite.

At S402, the control portion 10 obtains probe data (position and velocity) regarding other vehicles traveling around the own vehicle. The control portion 10 obtains the probe data, which is uploaded from the probe car to the database 33 of the center device 3, through the radio communication portion 19. Alternatively the control portion 10 may directly obtain the data of the position and velocity from surrounding vehicles through a vehicle-to-vehicle communication. The control portion 10 may obtain the data of the position and velocity of surrounding vehicles by detecting the surrounding vehicles through the surrounding vehicle detector 17.

Next at S404, in a case where the vehicle is stopped on the road shoulder or the side strip, the control portion 10 compares traffic flow around the own vehicle with a movement of the own vehicle. Traffic flow is estimated by the probe data and the like obtained at S402. As a result of the comparison, the control portion 10 determines whether the vehicle is stopped on the road shoulder or the side strip, and the traffic flow around the own vehicle is different from the movement of the own vehicle, that is, the traffic flow around the own vehicle is observed regardless of the stop of the own vehicle. The control portion 10 determines the driving state of the driver based on an assumption that the driver is likely to be in the drive suspending state in a case where, for example, the movement of the own vehicle is different from the surrounding traffic flow because the driver stop traveling the vehicle with pulling to the side of the road due to the signal of a mobile phone during driving.

In a condition where the own vehicle is stopped on the road shoulder or the side strip, and the traffic flow around the own vehicle is different from the movement of the own vehicle, which corresponds to YES at S404, the process proceeds to S406. On the other hand, when the above condition is not fulfilled, which corresponds to NO at S404, the process proceeds to S410.

At S406, the control portion 10 determines whether a present stop state has continued for a predetermined period (e.g., 1 minute) or more. When the stop state has continued for the predetermined period or more, which corresponds to YES at S406, the process proceeds to S408. On the other hand, when the stop state has not continued for the predetermined period, which corresponds to NO at S406, the process proceeds to S410.

At S408, the control portion 10 outputs the drive suspending state as a result of the drive state check process. On the other hand, at S410, the control portion 10 outputs the drive continuation state as a result of the drive state check process.

Technical effects of the in-vehicle device 1 in the above described embodiment will be described below. In a condition where the idle stop is operating and the driver is in the drive suspending state, an alert with regard to a cause of the engine stop state is made to the driver. By producing the alert to the driver in appropriate timing based on such an assessment of the situation, the driver is effectively prevented from misunderstanding about the cause of the engine stop state.

A first manner for determining the drive suspending state of the driver is as follows. When (i) the attribute of the present stop location of the vehicle matches the specified attribute which is pre-registered as a drive suspending condition and (ii) a stopping period of the vehicle is equal to or longer than a specified period, it is determined that the driver is in the drive suspending state. This makes it possible to determine the drive state based on the assumption that the driver is likely to become in the drive suspending state when the driver stops the vehicle at the specific facility. In the above, the specific facility is a place where the driver possibly waits inside the vehicle.

A second manner for determining the drive suspending state of the driver is as follows. When (i) the present stop location of the vehicle and the present time correspond to the stop location and the time indicated in the stop tendency data that is based on the vehicle travel history, and (ii) a stopping period of the vehicle is greater than or equal to a specified period, it is determined that the driver is in the drive suspending state. This makes it possible to determine the drive state based on the assumption that the driver is likely to become in the drive suspending state when, for example, the driver habitually stops the vehicle at a same position in a same time zone in order to, for example, pick up the family to a cramming school, a lesson and the like.

A third manner for determining the drive suspending state of the driver is as follows. When (i) the present stop location of the vehicle and the present time correspond to the stop location and the time indicated in schedule data with regard to the driver behavior plan, and (ii) a stopping period of the vehicle is greater than or equal to a specified period, it is determined that the driver is in the drive suspending state. This makes it possible to determine the drive state based on the assumption that the driver is likely to become in the drive suspending state when the driver stops the vehicle at a location and time which are indicated in the schedule data reflecting the driver behavior plan.

A fourth manner for determining the drive suspending state of the driver is as follows. When: (i) the vehicle is stopped on the road shoulder or the side strip; (ii) the traffic flow around the vehicle is different from the movement of the vehicle; and (iii) a stopping period of the vehicle is greater than or equal to a specified period, it is determined that the driver is in the drive suspending state. This makes it possible determine the drive state based on the assumption that the driver is likely to become in the drive suspending state when, for example, the movement of the vehicle is different from the surrounding traffic flow because the driver stops to drive the vehicle with pulling to the side of the road due to the signal of a mobile phone during driving.

In the above embodiments, the control portion 10, which performs S14 and S20, can correspond to an example of stop cause determination section, and also can correspond to an example of stop cause determination means. The control portion 10, which performs S22, can correspond to an example of drive state check section and also can correspond to an example of drive state check means. The control portion 10, which performs S26, S28 and S30, can correspond to an example of informing section and also can correspond to an example of informing means.

Summarizing the above embodiment, the present disclosure relates to the in-vehicle informing device equipped in the vehicle including the idle reduction function. The in-vehicle informing device in the present disclosure includes (i) the engine stop cause check section, (ii) the drive state check section, and (iii) the alert section.

The stop cause check section determines whether or not the engine is in an stop state by having been automatically stopped by the idle reduction function. When the stop cause check section determines that the engine is in the stop state by having been automatically stopped the idle reduction function, the drive state check section (i) obtains stop state data about a stop state of the vehicle, (ii) determines whether or not the stop state of the vehicle indicated by the stop state data corresponds to a specified drive suspending condition, and (iii) determines that a driver of the vehicle is in a drive suspending state when the drive state check section determines that the stop state of the vehicle indicated by the stop state data corresponds to the specified drive suspending condition. When the drive state check section determines that the driver is in the drive suspending state, the alert section informs the driver that the engine is in the stop state by having been automatically stopped by the idle reduction function, by utilizing an information giving portion equipped in the vehicle.

In the present disclosure, in a case where the idle reduction function is operating and the driver is in the drive suspending state, the driver receives information about the cause of the engine stop state. Thus in the spirit and scope of the present disclosure, it is assumed that when the drive is in the drive suspending state and is suspended from driving, the driver mistakes the engine stop state which is set by the idle reduction function for the engine stop state which is by an OFF position of an ignition switch. By producing the alert to the driver with appropriate timing based on such an assessment of the situation, the driver is effectively prevented from misunderstanding about the cause of the engine stop state.

With regard to the idle stop in a case where the driver keeps driving and temporarily stops the vehicle, for example waiting for a light to change, it is unlikely that the driver misjudges that an ignition switch is in an OFF position. Therefore, in the drive continuation state, the alarm to the driver is not produced so that excess information giving is prevented.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An in-vehicle informing device equipped in a vehicle with an idle reduction function which causes an engine of the vehicle to be stopped automatically in response to fulfillment of a predetermined stop condition and thereafter causes the engine to be restarted automatically in response to fulfillment of a predetermined restart condition, the in-vehicle informing device comprising:
a stop cause check section configured to determine whether or not the engine is in an stop state by having been automatically stopped by the idle reduction function;
a drive state check section configured to, in cases where the stop cause check section determines that the engine is in the stop state by having been automatically stopped the idle reduction function,
(i) obtain stop state data about a stop state of the vehicle,
(ii) determine whether or not the stop state of the vehicle indicated by the stop state data corresponds to a specified drive suspending condition, and
(iii) determine that a driver of the vehicle is in a drive suspending state when the drive state check section determines that the stop state of the vehicle indicated by the stop state data corresponds to the specified drive suspending condition; and
an alert section configured to, in cases where the drive state check section determines that the driver is in the drive suspending state,
inform the driver that the engine is in the stop state by having been automatically stopped by the idle reduction function, by utilizing an information giving portion equipped in the vehicle, wherein
the alert section does not inform the driver that the engine is in the stop state by having been automatically stopped by the idle reduction function when the drive state check section determines that the driver is in a drive continuation state.

2. The in-vehicle informing device according to claim 1, wherein:
the drive state check section obtains data about an attribute of a present vehicle stop location as the stop state data;
the drive state check section determines whether or not the attribute of the present vehicle stop location corresponds to a predetermined attribute of the drive suspending state condition; and
the drive state check section determines that the driver is in the drive suspending state when the attribute of the vehicle present stop location corresponds to the predetermined attribute.

3. The in-vehicle informing device according to claim 1, wherein:
the drive state check section obtains data indicating a present stop location of the vehicle and a present time as the stop state data;
the drive state check section obtains stop tendency data as the drive suspending state condition, wherein the stop tendency data is information about a history of travel of the vehicle in past and includes a stop location and a stop time when the driver became in the driver suspending state;
the drive state check section determines whether or not the present stop location of the vehicle and the present time corresponds to the stop location and the time indicated in the stop tendency data; and
the drive state check section determines that the driver is in the drive suspending state when the present stop location of the vehicle and the present time correspond to the stop location and the time indicated in the stop tendency data.

4. The in-vehicle informing device according to claim 1, wherein:
the drive state check section obtains data indicating a present stop location of the vehicle and a present time as the stop state data;
the drive state check section obtains schedule data with respect to a location and a time associated with a future driver's plan as the drive suspending state condition, the schedule data including a behavior plan of the driver;
the drive state check section determines whether or not the present stop location of the vehicle and the present time corresponds to the stop location and the time indicated within the schedule data; and
the drive state check section determines that the driver is in the drive suspending state when the present stop location of the vehicle and the present time correspond to the stop location and time indicated within the schedule data.

5. The in-vehicle informing device according to claim 1, wherein
the drive state check section obtains data indicating a present stop location of the vehicle as the stop state data,
the drive state check section obtains data about traffic flow with respect to a movement of other vehicles around the vehicle equipped with the in-vehicle informing device as the drive suspending state condition,
the drive state check section determines whether or not the traffic flow of other vehicles is different from a movement of the vehicle equipped with the in-vehicle informing device, and
the drive state check section determines that the driver is in the drive suspending state, when the traffic flow of other vehicles is different from a movement of the vehicle equipped with the in-vehicle informing device.

6. The in-vehicle informing device according to claim 5, wherein
the drive state check section determines whether or not the vehicle is stopped in a road shoulder or a side strip and whether or not the traffic flow around other vehicles is different from the movement of the vehicle equipped with the in-vehicle informing device, and
the drive state check section determines that the driver is in the drive suspending state, when the vehicle is stopped in the road shoulder or the side strip and the traffic flow around other vehicles is different from the movement of the vehicle equipped with the in-vehicle informing device.

7. The in-vehicle informing device according to claim 2, wherein
the drive state check section determines whether or not the stop state of the vehicle has continued for a predetermined period or more, and
the drive state check section determines that the driver is in the drive suspending state when the stop state of the vehicle corresponds to the specified drive suspending condition and the stop state of the vehicle has continued for the predetermined period or more.

8. A informing method in a vehicle with an idle reduction function which causes an engine of the vehicle to be stopped automatically in response to fulfillment of a predetermined stop condition and thereafter causes the engine to be restarted automatically in response to fulfillment of a predetermined restart condition, the informing method comprising:

determining whether or not the engine is in an stop state by having been automatically stopped by the idle reduction function;

in cases where the engine is in the stop state by having been automatically stopped by the idle reduction function,
  (i) obtaining stop state data about a stop state of the vehicle,
  (ii) determining whether or not the stop state of the vehicle indicated by the stop state data corresponds to a specified drive suspending condition, and
  (iii) determining that a driver of the vehicle is in a drive suspending state when the stop state of the vehicle indicated by the stop state data corresponds to the specified drive suspending condition; and informing the driver that the engine is in the stop state by having been automatically stopped by the idle reduction function, by utilizing an information giving portion equipped in the vehicle, in cases where the driver is in the drive suspending state, wherein keeping the information giving portion silent when the drive state check section determines that the driver is in a drive continuation state.

9. A non-transitory tangible computer readable storage medium storing a computer-executable program that causes a computer to perform the method of claim 8.

10. The in-vehicle informing device according to claim 1, wherein
  the drive continuation state is a state where the driver keeps traveling the vehicle, and includes a case where a series of driving operation for traveling the vehicle is continuing, although the vehicle is temporarily stopped, and
  the drive suspending state is a state where the driver is suspended from driving, and includes a case where a series of driving operation is finished.

11. The in-vehicle informing device according to claim 8, wherein
  the drive continuation state is a state where the driver keeps traveling the vehicle, and includes a case where a series of driving operation for traveling the vehicle is continuing, although the vehicle is temporarily stopped, and
  the drive suspending state is a state where the driver is suspended from driving, and includes a case where a series of driving operation is finished.

* * * * *